United States Patent [19]

Anderson

[11] 4,011,915
[45] Mar. 15, 1977

[54] TOOL SHANK MOUNTING ASSEMBLY
[75] Inventor: Charles W. Anderson, Kewanee, Ill.
[73] Assignee: Chromalloy American Corporation, St. Louis, Mo.
[22] Filed: Nov. 10, 1975
[21] Appl. No.: 630,418
[52] U.S. Cl. ............................... 172/265; 172/763
[51] Int. Cl.² ..................................... A01B 61/04
[58] Field of Search .......... 172/710, 267, 268, 269, 172/264, 265, 763, 266

[56] References Cited
UNITED STATES PATENTS

| 2,707,425 | 5/1955 | Charley | 172/269 |
| 3,235,013 | 2/1966 | Kirkpatrick | 172/763 X |
| 3,493,055 | 2/1970 | Peursem | 172/265 X |
| 3,782,481 | 1/1974 | Quanbeck | 172/265 |

Primary Examiner—George J. Marlo
Attorney, Agent, or Firm—Johnson, Dienner, Emrich & Wagner

[57] ABSTRACT

The tool shanks of an agricultural implement such as a cultivator or chisel plow are removably fixed to assemblies which include a holder pivotally connected to the rear side of a mounting member. The mounting member is recessed on its upper side and provided with an overlying clamp arm by which the assembly is affixed to the tool bar of the implement. A tension spring connected between the mounting member and the lower end of the shank holder reacts against swing of the shank holder on its pivotal connection to the mounting member in use of the implement; and the mounting member and shank holder have aligned stops and abutments above and below their pivotal connection which limit the swing of the shank holder.

6 Claims, 3 Drawing Figures

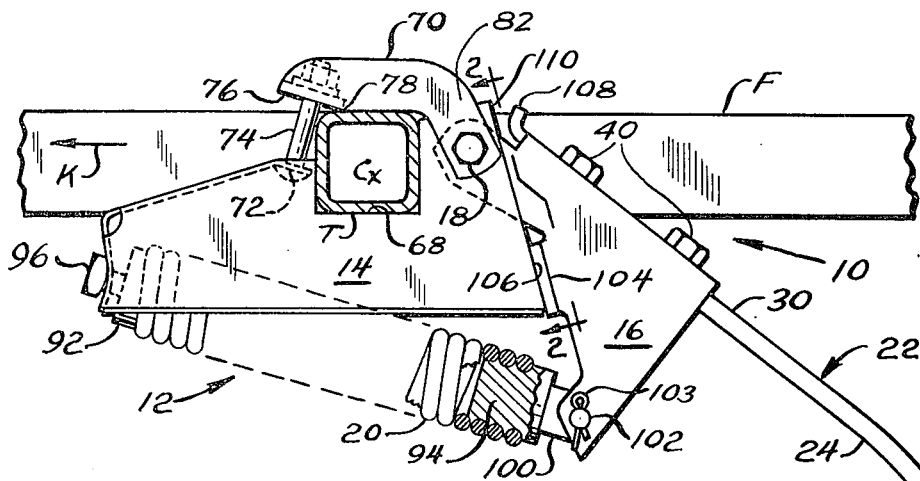
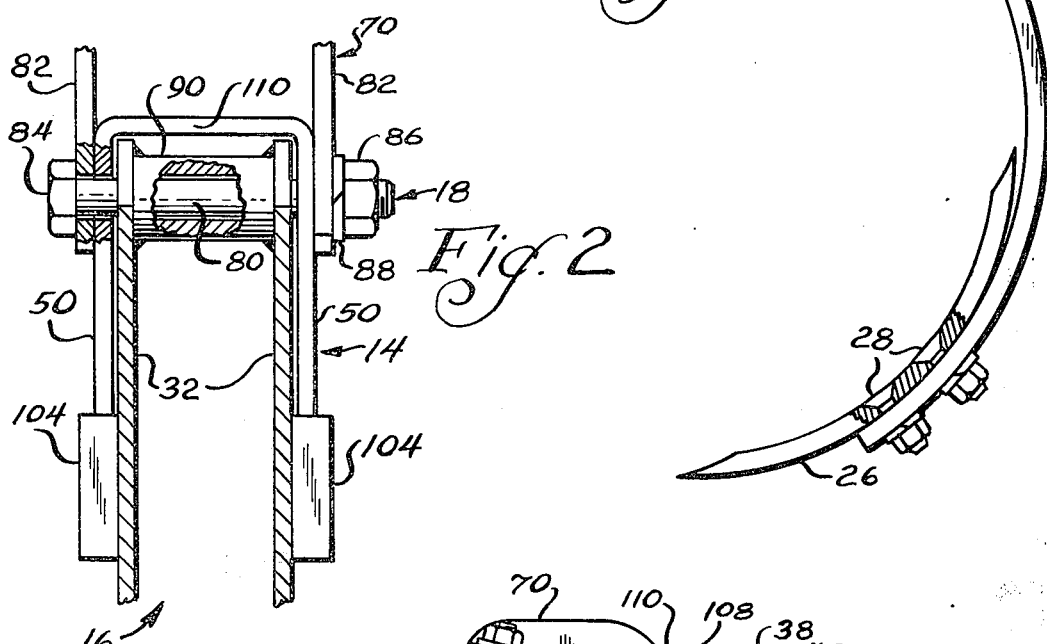
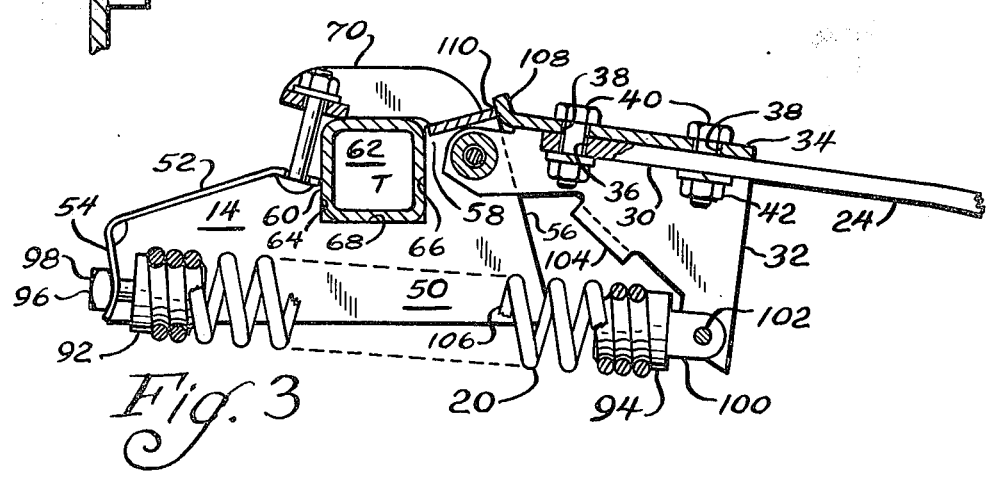

TOOL SHANK MOUNTING ASSEMBLY

This invention relates generally to agricultural implements which are used in soil tillage and particularly to improved means for mounting the shanks of their soil working tools to the implement frame.

A principal object of the invention is to provide a spring-cushioned tool shank mounting assembly which may be solidly but releaseably fixed to the implement frame, which is of simplified but durable construction and which is therefore economical to manufacture and at the same time is effective in its operation and utility.

Prior to the invention, it was known to pivotally connect the shanks of such soil working tools to the implement frame and rely upon a tension spring connected therebetween which would yieldably hold the tool in a working position. It was also known that by such arrangements, the shank and its tool would accommodate a vertical vibratory action which would be helpful to break up clods and shed trash or stubble in the soil working action of the supported tool. It was also appreciated that the yieldable support of the tool would allow the tool to ride upwardly over obstacles met in the field and then return to its working position. Thus today, almost every commercially available field cultivator, chisel plow or similar tillage implement has some provision for resiliently supporting its tools to the implement frame. Exemplary of such structures which have been patented are those disclosed in U.S. Pat. Nos. 1,524,369, 2,776,614, 2,850,956, 3,098,531, 3,108,643, 3,173,494, 3,493,055, 3,536,146, 3,606,928, 3,700,038, 3,700,039, 3,782,481 and 3,825,073.

In accordance with this invention, such a spring-cushioned tool shank mounting assembly comprises a first or shank support member which detachably connects to a tool bar section of the implement frame, a second member which pivotally connects to the first member and a tension spring which lies beneath the first member, connecting between its forward end and the lower end of the second member. The second member of this assembly comprises a shank holder to which a separably constituted tool shank and its soil working point may be bolted or otherwise replaceably mounted thereto.

Thus a first feature of the invention is that the tool shank is readily replaceable. It may be removed from the shank mounting assembly with the assembly in place on the implement frame and without disturbing the relationships of the components of the assembly including the preadjusted loading of the tension spring.

In this latter connection, a further feature of the invention is that the first and second members have abutments and cooperating stops on opposite sides of their pivotal connection, one of which abutments and cooperating stops limit the pull of the tension spring on the shank holder so as to locate the working position of the tool point below and behind the pivotal connection. A second abutment and cooperating stop define the angle through which the tool point may be swung on the pivotal connection against the tension spring to clear obstructions met in the field.

A still further feature of the invention is the horizontal disposition in which the first or shank support member is mounted to the underside of the implement frame tool bar, the upper side of the shank support member having a recess with forward and rear vertical walls between which the tool bar is located. Securement of the shank support member to the tool bar is completed by bolting the forward end of an overlying clamp arm having its rear end pivotally connected to the shank support member behind the recess. In its preferred form, a common pivot element connects both the clamp arm and the shank holding member to the first or shank support member.

Thus a further feature of the invention is the convenient means employed for mounting the shank assembly to the tool bar and the construction of which through the front and rear walls of the tool bar receiving recess provides resistance to torsional strain in the use of the implement in a tillage act.

Another feature of the invention is that loading of the tension spring may be adjusted without affecting the work position of the tool point or the extent of its angular displacement.

Other features and advantages of the invention will be at once apparent or will become so upon consideration of the preferred embodiment thereof which now will be described.

Referring therefore to the drawings which illustrate the invention:

FIG. 1 is a side elevational view of a spring-cushioned tool shank assembly shown mounted on the tool bar of an agricultural implement frame;

FIG. 2 is a vertical sectional view taken therethrough along line 2—2 of FIG. 1 looking in the direction indicated by the arrows; and FIG. 3 is a fragmented sectional view taken longitudinally of the assembly and illustrates the shank holder pivoted against the tension spring to its raised or obstruction clearing position.

Referring more specifically to the several views wherein like parts are identified by like reference numerals and/or indicia, FIG. 1 illustrates the tool shank mounting assembly 10 rigidly fixed to a cross piece or toolbar T of the frame F of an agricultural implement such as a field cultivator or chisel plow. Such an assembly 10 is illustrated as comprising a first unit 12 embodying a first tool bar mounting or shank support member 14 having a second or shank holding member 16 pivotally connected thereto as at 18 and a tension spring 20 connected between the forward end thereof and a lowermost forward end of the shank holder member 16. Assembly 10 also includes a second unit 22 embodying a tool shank 24 having a soil engaging tool point 26 replaceably connected to the curved lower end portion thereof as by bolts 28. Tool shank 24 as illustrated comprises a parallel-sided leaf spring, the upper straight portion 30 of which seats snugly between legs 32 and against base 34 of the channel-shaped shank holding member 16 of the first unit. Said straight portion 30 as illustrated in FIG. 3 has a pair of axially spaced openings 36 which align with openings 38 in the base of the shank holding member to receive the stems of mounting bolts 40. Nuts 42 tightened on the threaded ends of said bolts detachably secure the tool unit 22 to the spring-tensioned pivoted shank holder 16 of the first mentioned tool bar mounting unit 12 of the assembly.

Referring now the first or tool bar mounting unit 12, its first or shank support member 14 comprises a pair of spaced vertical sidewalls 50 joined by an integral upper wall 52 illustrated as inclined upwardly and rearwardly at a small angle to the horizontal. The smaller-dimensioned forward end of member 14 is substantially closed by a downwardly extending lip portion 54 of said upper wall 52 and the rear-larger-dimensioned end of the member 14 is left open. The rear edges 56 of its sidewalls are, however, inclined forwardly at a small angle to vertical for a purpose as afterwards made clear.

The upper wall 52 of said member 14 has a rectangular cutout 58 which aligns with similarly dimensioned cutouts 60 in the upper portion of its two sidewalls 50 providing a recess indicated generally at 62. Recess 62 has forward vertical walls 64 and rearward vertical walls 66 between which is received tool bar T. As illustrated by FIGS. 1 and 3, tool bar T is of conventional generally square or rectangular shape and vertical walls 64, 66 of recess 62 are so spaced that tool bar T snugly fits therebetween. Also, as illustrated, rear walls 66 approximate the height of tool bar T and forward walls 64 aproximately one-half its height. The forward walls 64 thus effectively transfers the pulling force of the implement on the shank assembly 10 as indicated by arrow K in FIG. 1 and the two walls 64, 66 being effective to resist torsional strain placed thereon by the shank assembly when performing a tilling function. To secure the assembly 10 to the tool bar and against the flat bottom walls 68 of the recess 62, a clamp arm 70 is pivotally connected to member 14 at 18 behind recess 62 and above the center line x of the tool bar received in said recess. Clamp arm 70 engagingly overlies the tool bar and has its forward end bolted to angle lip portion 72 of member 14 as by inclined bolt 74. As illustrated, bolt 74 serves to hold clamp arm 70 snugly against the tool bar to lock the same within recess 62.

As previously mentioned, both clamp arm 70 and shank holding member 16 preferably swing about a common pivot identified generally at 18. Referring to FIG. 2 one construction of pivot and manner of assemblying clamp arm 70 and shank holder 16 thereabout is illustrated. As there illustrated, pivot 18 comprises a hardened pin 80 extending through provided openings in walls 32 of the inwardly extending shank holding member 16, walls 50 of the intermediately located mounting support member 14 and the outer located sidewalls 82 of the clamp arm 70. Pivot pin 80 has an enlarged head 84 at one end, its opposite end being threaded and having a nut tightened thereon against a washer 88. Preferably, a liner of wear-resistant material (not shown) will surround pin 80 throughout its length and will be engaged at its opposite ends by the aforementioned pivot pin head 84 and nut, washer combination 86, 88 at its opposite end. Also, preferably a bushing 90 surrounds pin 80 and maintains a required spacing of sidewalls 32 to which it is shown welded. Any other appropriately suitable pivotal mounting may be employed.

Referring again to FIGS. 1 and 3 the aforementioned tension spring 20 has its opposed ends threadedly connected over externally-threaded end inserts 92 and 94. End insert 92 connects to lip portion 54 at the forward end of shank support member 14 of the first assembly unit 12 by means of a headed connector 96 which passes through provided opening 98 in said lip portion 54 and is fixedly secured to end insert 92 as by a threaded connection thereto. End insert 94 has a rigidly connected or integral ear 100 which is located between the two sidewalls 32 of said shank holding member 16 and is pivotally connected thereto as by a headed pin 102. Cotter pin 104 completing the assembly.

It will be appreciated that by placing the jaws of an open end wrench about the particularly-shaped head of connector 96, end insert 92 can be threaded inwardly or outwardly of spring 20 to vary the length and thereby the effective loading thereof. Also as illustrated in the several views, the two sidewalls 32 of the shank holding member 16 have outwardly bent portions defining stops 104 which under the pull of spring 20 engage abutments 106 formed by the inclined rear edges 56 of the sidewalls 50 of the shank support member 14 adjacent the lower edge thereof and below pivot connection 18. Engagement of said stops 104 and abutment 106 define the working position of the tool point 26. As illustrated in FIG. 1, edges 56 and thereby abutments 106 are so located that its working position is behind a vertical containing the pivotal connection 18. The forward upturned end of the base 34 of the channel shaped shank supporting member 16 constitutes a second stop 108 located to the opposite side or above pivotal connection 18 and is aligned to engage with the rear edge 110 of the upper wall 52 of the mounting support member 14. Said rear edge 110 defines a second abutment also to the opposite side and above pivotal connection 18 and limits the angular swing of the shank holding member 14.

As thus described, the preferred embodiment is seen capable of achieving all the recited objects, advantages and features of the invention. It will be understood that other arrangements and variations of the essential components of the described embodiment will be apparent to those skilled in the art and that such modifications can be made within the spirit and scope of the invention as defined by the claims.

Now having disclosed the invention, what is claimed is:

1. In an agricultural implement having a tool bar of generally rectangular cross section to which is removably mounted a spring-cushioned tool shank assembly, the improvement wherein the assembly comprises first and second units, the first unit embodying a shank support member having a pair of spaced vertical sidewalls joined by a integral top wall having a lip portion over the forward end of the shank support member, said top wall containing a generally rectangular shaped opening intermediate its forward and rear ends and said side walls each having a cutout in the upper edge thereof below said opening, said cutouts and opening together defining a tool bar receiving recess in which the forward and rear side edges are spaced apart to closely engage the tool bar received therein, the rear edges of said cutouts having a height approximating the corresponding cross sectional dimension of said tool bar and the forward edges of said cutouts having a height approximately at least half said cross sectional dimension, a clamp arm having a forward portion overlying said recess and a depending rear portion having spaced walls straddling the side walls of the shank support member behind said cutouts, a pivot pin pivotally connecting said straddling walls of the clamp arm to the shank support member behind its tool bar receiving recess, and bolt means releaseably securing the forward end of the clamp arm to the top wall of the shank support member forwardly of said recess, the underside of the forward portion of the clamp arm snugly engaging the top surface of the tool bar upon tightening of the bolt means to rigidly secure the assembly to the tool bar, first unit further embodying a channel-shaped shank holding member having a forwardly inclined base wall and spaced generally parallel depending sides, said spaced sides of the shank holding member having forward portions extending through the open rear end of the shank support member and pivotally mounted on said pivot pin, and a tension spring at least partially confined within the interior of the shank support member below its tool bar receiving recess, one end of said tension spring being fixed to the lip portion of the top wall forwardly of the tool bar receiving recess and below the pivot pin on which the shank holding member swings, the other end of the tension spring being fixed to the lower end of the shank holding member below and behind said pivot pin, comprising a tool shank embodying a leaf spring having a forwardly curved lower end portion to which is replaceably connected a soil engaging tool point, said tool shank having a straight end portion which is detachably bolted to the base wall of the shank holding member of the first unit, the sides of the shank holding member of the first unit having forwardly disposed outwardly turned flange portions which engage with the rear edge of the shank support member sidewalls below and behind the pivot pin under the tension of the spring member to define the working position of the soil engaging tool point, the forward end of the shank holding member base wall constituting a second stop spaced above said pivot pin which engages the rear edge of the top wall of the shank support member to limit the angular swing of the shank and its soil engaging tool point, said second unit including the tool shank and its soil engaging tool point being readily detachable from the first unit for ready replacement without disconnecting the spring or disturbing the relationship of the members of the first unit.

2. The improvement of claim 1 wherein the rear edge of the shank support member sidewalls which are engaged by the outwardly turned flange portions of the shank holding member constitute abutments so disposed as to locate the working position of the soil engaging tool point behind a vertical including the pivot pin on which the shank holding member swings.

3. The improvement of claim 1 further including means for adjusting the tension of the spring member without disturbing the working position of the tool point.

4. The improvement of claim 1 wherein the connection of the spring member to the shank holding member is disposed below and behind the engagement of the outwardly turned flange portions of the shank holding member with the rear edge of the shank support member under the tension of the spring member.

5. The improvement of claim 1 wherein the straight end portion of the tool shank seats snugly between the depending sides of the shank holding member and against the flat underside of its base wall.

6. A spring cushioned tool shank mounting assembly for the tool bar of an agricultural implement comprising a shank support member having a pair of spaced vertical sidewalls joined by a rearwardly inclined integral top wall having a downwardly turned lip portion closing the forward end of the shank support member, said top wall having a generally rectangular-shaped opening intermediate its forward and rear ends, and said side walls each having a cutout in the upper edge thereof with front and rear edges which align with said opening, said aligned cutouts and opening together defining a tool bar receiving recess in which the forward end rear side edges are spaced apart to closely engage a tool bar received therein, the rear edges of said cutouts approximating the corresponding cross sectional dimension of said tool bar and the forward edge of said cutouts having a height approximating half said cross sectional dimension, a clamp arm having a forward portion overlying said recess and a depending rear portion having spaced walls which straddle the side walls of the shank support member behind said cutouts, a pivot pin pivotally connecting said rear portion walls of the clamp arm to the shank support member behind its tool bar receiving recess, and bolt means releaseably securing the forward portion of the clamp arm to the top wall of the shank support member forwardly of said recess, said forward portion of the clamp arm being adapted to snugly engage the tool bar upon tightening of the bolt means to rigidly secure the assembly to the tool bar, a channel-shaped shank holder having a flat fowardly inclined base wall and generally parallel spaced depending sides, said spaced sides of the shank holder having hinge portions extending through the open rear end of the shank support member and pivotally mounted on said pivot pin, said base wall having spaced openings by which the supporting shank of a soil engaging tool point may be detachably fixed thereto, and a forwardly inclined tension spring at least partially confined within the interior of the shank support member, one end of said tension spring being fixed to the downwardly depending lip portion of the top wall forwardly of the tool bar receiving recess and pivot pin on which the shank holder swings, the other end of the tension spring being fixed to the lower end of the shank holder below and behind said pivot pin, the sides of the shank holder having outwardly turned flange portions below said hinge ears which engage with the rear edge of the shank support member sidewalls below and behind the pivot pin under the tension of the spring member to define the working position of a soil engaging tool point thus fixed to the shank holder, the forward end of the shank holder base wall constituting a second stop spaced above and behind said hinge ears and located to engage the rear edge of the top wall of the shank support member to limit the angular swing of the shank holder and thereby the soil engaging tool point and its shank when fixed thereto.

* * * * *

UNITED STATES PATENT OFFICE
CERTIFICATE OF CORRECTION

PATENT NO. : 4,011,915
DATED : March 15, 1977
INVENTOR(S) : Charles W. Anderson

It is certified that error appears in the above-identified patent and that said Letters Patent are hereby corrected as shown below:

Column 5, line 13, After "pivot pin," insert --the second unit--.

Signed and Sealed this

Tenth Day of May 1977

[SEAL]

Attest:

RUTH C. MASON
Attesting Officer

C. MARSHALL DANN
Commissioner of Patents and Trademarks